Figure 1:
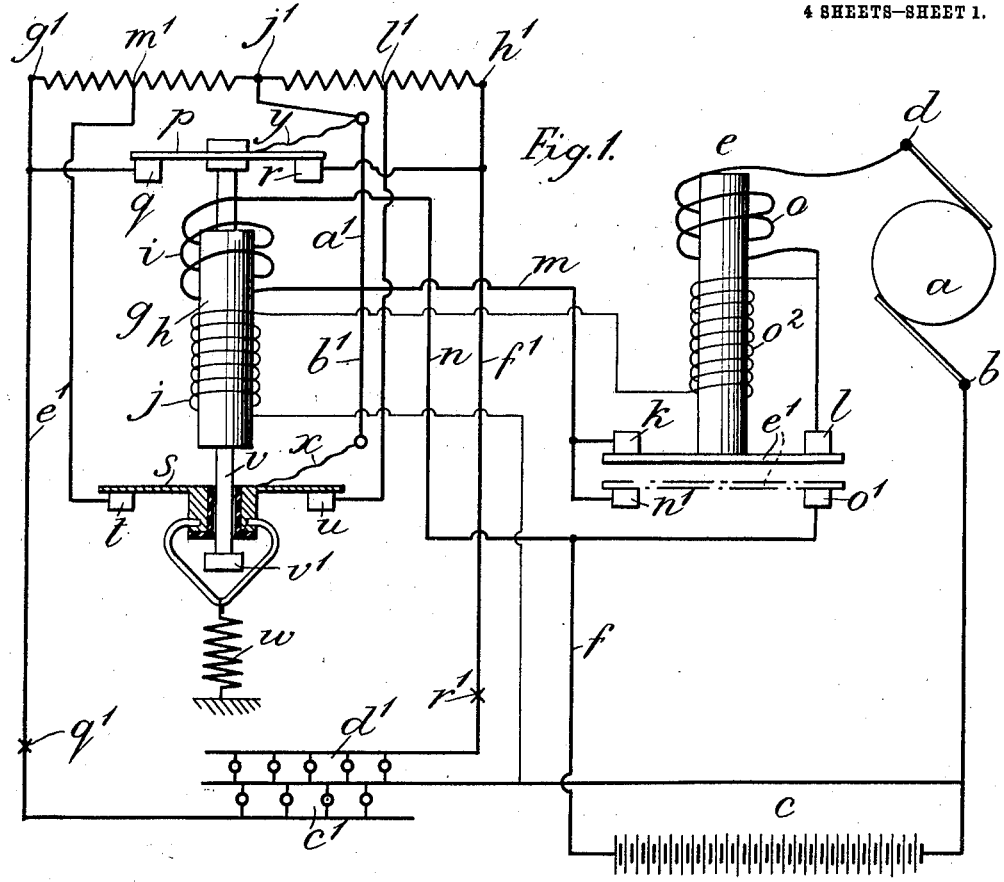

T. FERGUSON.
TRAIN AND LIKE ELECTRIC LIGHTING SYSTEM.
APPLICATION FILED OCT. 21, 1910.

1,004,005.

Patented Sept. 26, 1911.

4 SHEETS—SHEET 1.

T. FERGUSON.
TRAIN AND LIKE ELECTRIC LIGHTING SYSTEM.
APPLICATION FILED OCT. 21, 1910.
1,004,005.
Patented Sept. 26, 1911.
4 SHEETS—SHEET 2.
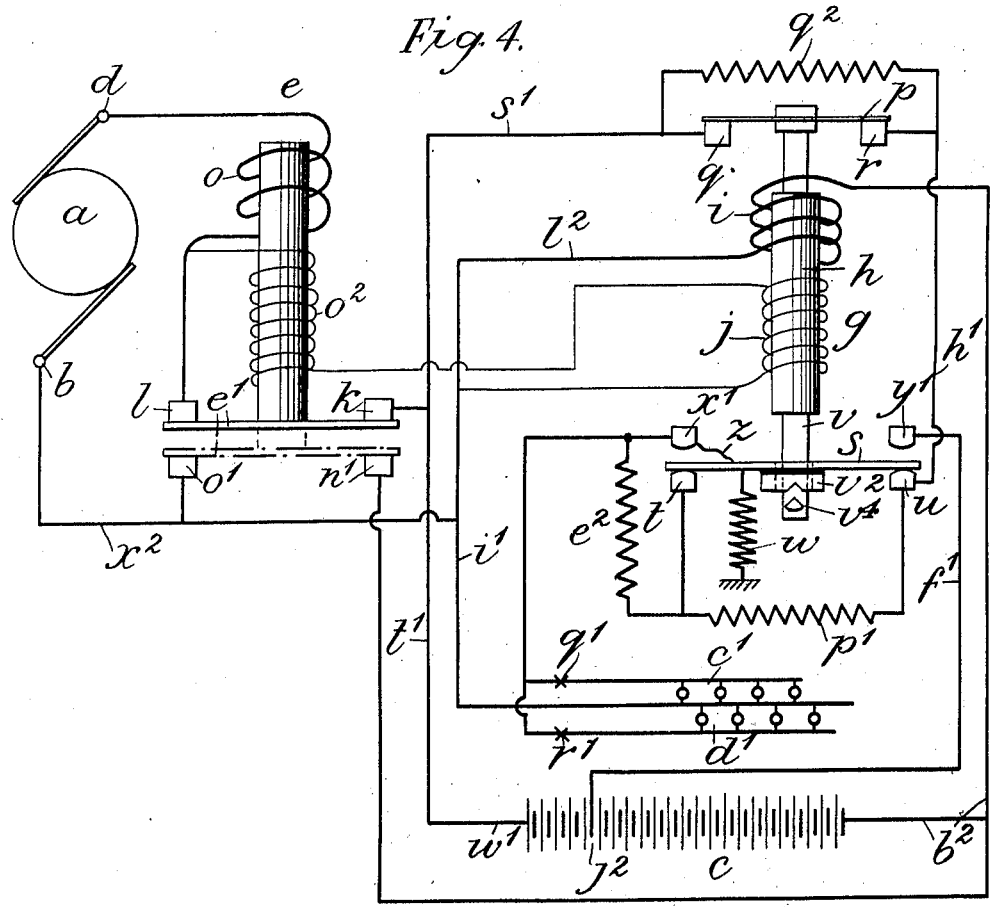

T. FERGUSON.
TRAIN AND LIKE ELECTRIC LIGHTING SYSTEM.
APPLICATION FILED OCT. 21, 1910.
1,004,005.
Patented Sept. 26, 1911.
4 SHEETS—SHEET 3.
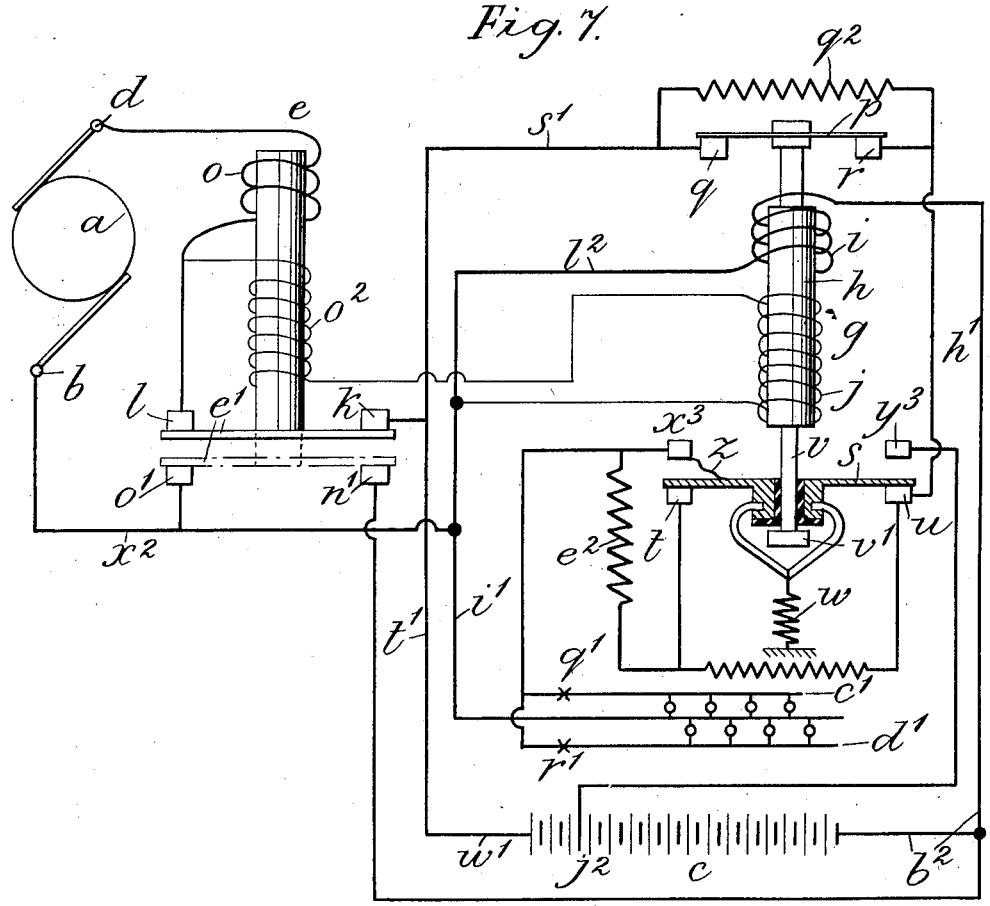

T. FERGUSON.
TRAIN AND LIKE ELECTRIC LIGHTING SYSTEM.
APPLICATION FILED OCT. 21, 1910.

1,004,005.

Patented Sept. 26, 1911.

UNITED STATES PATENT OFFICE.

THOMAS FERGUSON, OF ALTRINCHAM, ENGLAND, ASSIGNOR TO HIMSELF, AND THE LEEDS FORGE COMPANY LIMITED, OF LEEDS, ENGLAND.

TRAIN AND LIKE ELECTRIC-LIGHTING SYSTEM.

1,004,005.  Specification of Letters Patent.  Patented Sept. 26, 1911.

Application filed October 21, 1910. Serial No. 588,276.

*To all whom it may concern:*

Be it known that I, THOMAS FERGUSON, a subject of the King of Great Britain and Ireland, residing at Altrincham, in the county of Chester, England, have invented Improvements in Train and Like Electric-Lighting Systems, of which the following is a specification.

In electric lighting systems for trains and other moving vehicles, which employ electric storage batteries in conjunction with dynamos driven at variable speed—for instance from the axle of a carriage wheel—it is necessary to provide some means for automatically connecting and disconnecting the dynamo to and from the battery circuit when the dynamo voltage respectively rises above or falls below the battery voltage, and also to regulate the voltage at the lamp terminals by introducing some method of compensating for the excess voltage, above the normal battery voltage, which is required to force the charging current into the battery. If such voltage compensation were not introduced into the lamp circuit, the lamps, during the charging of the battery, would be subjected to a voltage about twenty-five per cent. above the normal voltage. It is common practice to absorb this excess voltage by means of a resistance inserted in the lamp circuit and to employ automatic electric switches operating in various ways for the purpose mentioned. It has also been proposed, with the same end in view, to connect the lamp circuit to a fewer number of cells than the dynamo is charging instead of introducing resistance into the lamp circuit.

The object of the present invention is to provide improved arrangements for obtaining compensation in the ways referred to. According thereto there is employed in conjunction with a dynamo "cut in" "cut out" switch, which may be of any usual character, a switch that controls the lighting circuit and has a winding which is constantly connected across the terminals of the dynamo and a second winding which, when the dynamo is cut in, upon the attainment of a predetermined voltage of the latter, is energized and remains energized by discharging current from the battery, so that the windings act in opposition and enable the dynamo to supply the lighting circuit directly in parallel with the battery until such time as the dynamo voltage sufficiently exceeds the battery voltage as to produce a reversal in the direction of current in the said second winding of the control switch whereupon the two windings will act together to operate the switch and alter the lamp circuit to suit the new conditions.

Other features of the invention consist in the provision of means whereby the cut out cut in switch, when the dynamo is at rest, short circuits the winding of the control switch that would otherwise be alone in circuit and energized by battery current tending to diminish pressure between the switch contacts; and in the provision of lost motion between parts of the control switch such as to enable the resistance to be inserted in the lamp circuit in steps in a manner *per se* known.

Figure 2:
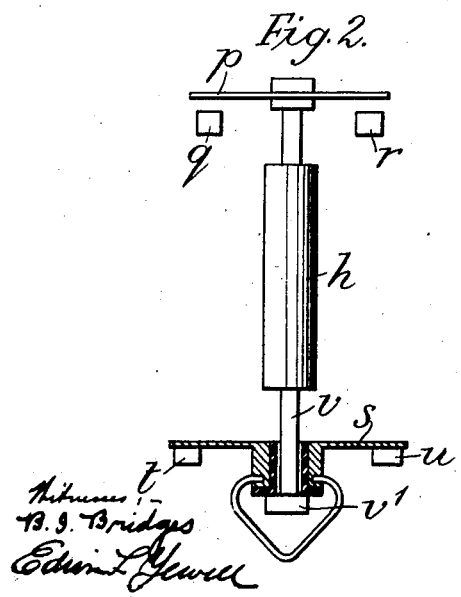
Figure 3:
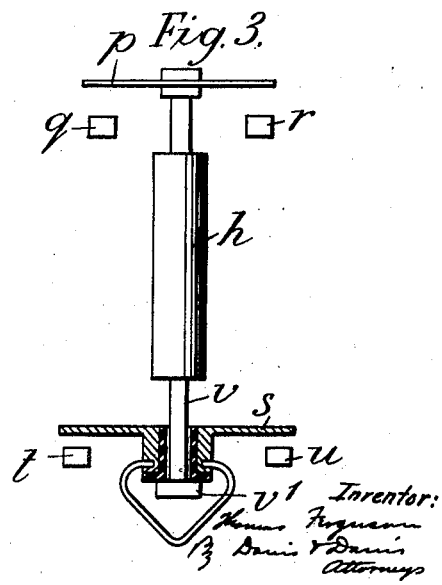
Figure 8:
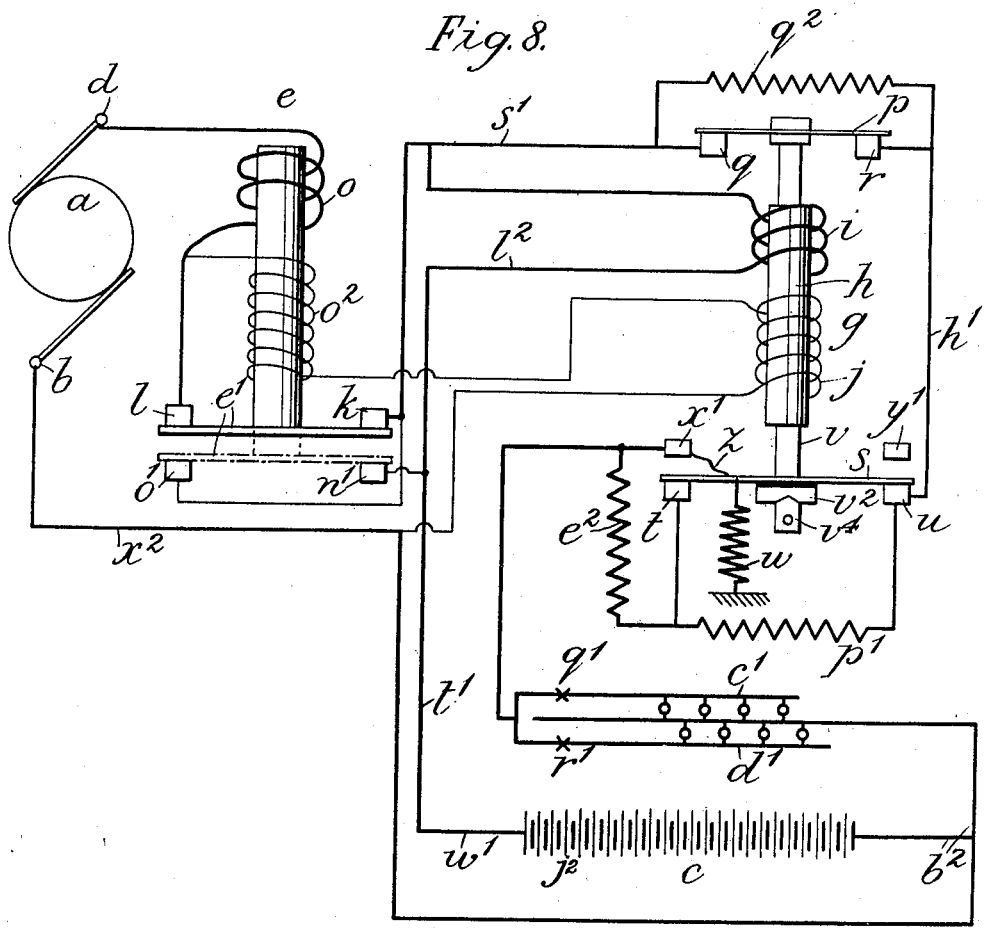

In the accompanying drawings, Figure 1 is a diagram of an arrangement according to the invention for introducing resistance into two lamp circuits. Figs. 2 and 3 show parts of the lamp circuit control switch of Fig. 1 in different positions. Fig. 4 is a diagram of a modified arrangement in which voltage compensation is effected by varying the number of cells connected to the lamp circuits, resistance also being used. Figs. 5 and 6 are views similar to Figs. 2 and 3 showing parts of the control switch of Fig. 4 in different positions. Figs. 7 and 8 are diagrams of further modified arrangements.

Referring first to Figs. 1, 2 and 3, the dynamo $a$ has one terminal $b$ connected to one pole of the battery $c$ and its other terminal $d$ adapted to be connected by way of the series coil $o$ of an ordinary " cut in cut out " switch $e$ (hereinafter simply called the cut out switch), the series coil $i$ of an automatic control switch $g$, and leads $m$, $n$ and $f$ to the other pole of the battery. The cut out switch $e$ is shown as of an ordinary solenoid type with series and shunt operating coils $o$, $o^2$, but any other suitable type of automatic switch might be used for the purpose. The automatic control switch $g$ is perferably of the solenoid type having a plunger $h$ and operated by a shunt winding $j$ in addition to the coil $i$ referred to. The plunger $h$ is provided at its upper end with a switch bar $p$ which is insulated from the plunger and makes contact with blocks $q$ and $r$, when it is in its down position, as shown in Fig. 1. At its lower end it is provided with a tail pin $v$ and collar $v^1$, the latter being adapted to engage with a switch bar $s$ and raise it up from its contact blocks $t$ and $u$, when the plunger is pulled to its full up position (see Fig. 3). The switch bar $s$ is insulated from the tail pin and collar, and is arranged so as to allow of free movement of the plunger and tail pin, without disturbing the switch bar $s$, until the plunger is lifted up sufficiently high for the collar to engage with the switch bar, see Fig. 2, when a further upward movement of the plunger will raise the switch bar off its contact blocks $t$, $u$ (see Fig. 3). The switch bar $s$ normally rests on and makes contact with its contact blocks $t$ and $u$, and is held down on them by means of a spring $w$. When the plunger is not pulled up, it hangs (due to its own weight) by means of switch bar $p$, on contacts $q$ and $r$ which are thus connected through the switch bar. The first part of the upward movement of the plunger $h$ will break the contact of $p$ with $q$ and $r$ (see Fig. 2) and the collar $v^1$ will come against the lower switch bar $s$ and then encounter the added resistance of the spring $w$, which the pull of the plunger must overcome before the switch bar $s$ can be raised. When the dynamo voltage rises to approximately that of the battery, the automatic switch $e$ moves into the "on" position (see Fig. 1), and the circuit from the dynamo $a$ to the battery $c$ is completed through it by way of its series coil $o$ and contacts $l$ and $k$, and thence by way of wire $m$, the series coil $i$ of the automatic switch $g$, and wires $n$ and $f$ to the battery $c$. The shunt coil $j$ of the automatic switch $g$ is connected across the dynamo terminals. It is often convenient, for the sake of obtaining a reasonably thick shunt wire, to connect this coil in series with the corresponding shunt coil $o^2$ of the automatic switch $e$, and when thus combined, the pair are connected across the dynamo terminals, as shown in Fig. 1. The direction of winding of the series and shunt coils $i$ and $j$ of the switch $g$ is such, that when current is flowing from the dynamo through the series coil $i$ to charge the battery $c$, it assists the action of the shunt coil in raising the plunger $h$, but when current is flowing through the series coil in the opposite direction from the battery, it acts against the shunt coil. It will be seen that the direction of the current from the dynamo is through the wire $m$ to the series coil $i$, and back by wires $n$ and $f$ to the battery. The wire $m$ is also connected by means of wires $a^1$ and $b^1$ to flexible connections $y$ and $x$, and thence to the respective switch bars $p$ and $s$. The upper contacts $q$ and $r$ are connected direct to their respective lamp circuits $c^1$ and $d^1$, by wires $e^1$ and $f^1$ through contact blocks $q^1$ and $r^1$, hence current can flow from the dynamo through wire $m$, wire $a^1$, flexible wire $y$, switch bar $p$, contacts $q$ and $r$, wires $e^1$ and $f^1$, to the respective lamp circuits, without passing through the coil $i$, but, if the current to the lamps is flowing from the battery $c$ through the wires $f$ and $n$, series coil $i$, wire $a^1$, flexible wire $y$, and so on to the lamps, its direction through the coil $i$ is such that it opposes the lifting action of coil $j$. The series and shunt coils $i$ and $j$ are so proportioned that the current in the shunt coil $j$ is not sufficient by itself to raise the weight of the plunger $h$, but when assisted by current passing through the series coil $i$ from the dynamo to charge the battery, it lifts the plunger, thus breaking the contact of switch bar $p$ with contacts $q$ and $r$, and, if the current is sufficiently strong, the force of the spring $w$ will also be overcome and the switch bar $s$ be raised, thus breaking the contact of $s$ with $t$ and $u$. $g^1$ $j^1$ and $h^1$ $j^1$, are two resistances connected together at $j^1$ and $j^1$ is connected to wires $a^1$ $b^1$. The outer ends $g^1$ and $h^1$ of the two resistances are connected by means of the wires $e^1$ and $f^1$ to their respective lamp circuits $c^1$ and $d^1$ through the contact blocks $q^1$ and $r^1$. The lower contacts $t$ and $u$ are respectively connected to the intermediate points $m^1$ and $l^1$ in the resistances.

With the arrangement described, when the dynamo $a$ is at rest, or running below a predetermined speed, the parts of the control switch $g$ are in the positions shown in Fig. 1 and current can pass from the battery through the wires $f$, $n$, coil $i$, wire $a^1$, flexible connection $y$, switch bar $p$, contacts $q$, $r$ and wires $e^1$ $f^1$ to the lamp circuits $c^1$ $d^1$. When the dynamo is in action and supplying current at the same voltage as the battery $c$, the dynamo and battery will simultaneously supply current to the wire $a^1$ and thence to the lamp circuits $c^1$ $d^1$ as before. When however the dynamo is in action and supplying current at a greater voltage, sufficient to flow through the series coil $i$ and charge the battery $c$, the plunger $h$ and switch bar $p$ will be lifted and current from the dynamo will pass to the lamps along wire $b^1$ and flexible wire $x$ to switch bar $s$, and from thence by contacts $t$ and $u$ through the part resistances $m^1$ $g^1$, and $l^1$ $h^1$ to the respective lamp circuits $c^1$, $d^1$. When the voltage of the dynamo rises still higher and sufficient to cause the plunger $h$ acting through the collar $v^1$ to raise the lower switch bar $s$, the current to the lamps has to pass along the wire $a^1$ to $j^1$, and through the complete resistances $j^1$ $g^1$ and $j^1$ $h^1$ to the respective lamp circuits. It will thus be seen that the voltage compensation is introduced in steps as the dynamo voltage and the current to the battery increases, and that no resistance is introduced until the dynamo voltage is sufficiently above the counter voltage of the battery, to send a charging current into the battery. When the dynamo $a$ is not working, and the lamps are being supplied from the battery alone, the only electro-magnetic force acting on the plunger $h$ is that due to the lamp circuit current in the coil $i$. As there is no opposition to this force from the shunt coil $j$, the pressure of the switch bar $p$ on its contacts $q$ $r$ will be partly eased off, and as this might be objectionable, the switch $e$ is provided with lower contacts $n^1$ $o^1$, connected to the terminals of the coil $i$. These contacts are connected by the switch bar $e^1$ of switch $e$ when in its "off" position (see dotted lines in Fig. 1), so that the winding $i$ is then short circuited and the trouble referred to avoided.

In the modified arrangement shown in Figs. 4, 5 and 6, the automatic control switch $g$ comprises a plunger $h$ having an upper switch bar $p$ normally resting on contacts $q$ and $r$, and lower tail pin $v$ with a catch $v^4$, which, in this case, may, as shown, be in the form of a knife edged cross pin. The plunger is also provided with a lower switch bar $s$ which normally rests on fixed contacts $t$ and $u$. In addition to these lower contacts, there are two other fixed contacts $x^1$ and $y^1$ provided above the bar, opposite to contacts $t$ and $u$ respectively. The actuating coils consist of a series coil $i$, arranged to carry the battery current, either charging or discharging, and a shunt coil $j$ connected, as before, across the dynamo terminals, or in series with the corresponding shunt coil $o^2$ of the switch $e$, the pair being connected across the dynamo terminals (see Fig. 4). The contact $k$ of the automatic cut out switch $e$ is connected to one terminal of the battery $c$ by wire $t^1$ and to the contact $q$ by wire $s^1$. The other terminal of the battery is connected by a wire $b^2$ through the series coil $i$ and thence by wires $l^2$ and $x^2$ to the corresponding terminal of the dynamo. The upper contact $r$ of the control switch $g$ is connected to the lower contact $u$ by wire $h^1$. Contacts $q$ and $r$ are bridged by a resistance $q^2$ and contacts $t$ and $u$ by a resistance $p^1$. Contact $x^1$ is connected to switch bar $s$ by a flexible wire $z$ and the lamp circuits $c^1$ and $d^1$ are also connected to this contact through their contact blocks $q^1$ and $r^1$. Contact $y^1$ is connected to the battery, but at a point $j^2$ so as to include between contact $y^1$ and wire $b^2$ only about seventy-five per cent. of the cells. The spring $w$ pulls on the switch bar $s$ at a point on the side of the tail pin next to contacts $x^1$ and $t$. The said switch bar $s$ is insulated from the tail pin $v$ and is free to move on the pin and to rock on the cross pin $v^4$ as shown in Fig. 5. The switch bar $s$ is provided with a block $v^2$ having a suitable groove in which the cross pin $v^4$ engages. With this arrangement, when the switch $e$ cuts the dynamo $a$ into action, the current from it can flow by wires $s^1$, contacts $q$, $r$ and switch bar $p$ and wire $h^1$ to contact $u$, then by switch bar $s$ and flexible wire $z$ to contact $x^1$ and so to the lamp circuits $c^1$, $d^1$ returning to the dynamo by wires $i^1$ and $x^2$. When the dynamo voltage has risen high enough to supply the lamps and a charging current to the battery $c$, the latter current goes by way of wire $t^1$ to the battery and back by way of the wire $b^2$, coil $i$ and wires $l^2$ $x^2$, the direction of the current through the coil $i$ being such as to assist the shunt coil $j$ in lifting the plunger $h$. When this takes place, the plunger will lift and contact will be broken at contacts $q$ and $r$, so that the current from the dynamo to the lamps will have to pass through the resistance $q^2$, but before the plunger can lift further, it has to overcome the force of the spring $w$. The full force of the spring is not however felt by the plunger in this position, but only a part of it, the amount being settled by the relative distances of spring $w$ and cross pin $v^4$ from the contact $t$. When the current to the battery increases further, the plunger will pull the switch bar $s$ up to the position shown in Fig. 5. The current from dynamo to lamps has then to pass through resistance $q^2$, wire $h^1$ and resistance $p^1$ to contact $t$, through the switch bar $s$, flexible wire $z$ and contact $x^1$ to the lamps. At the same time the reduced number of cells are connected across the lamp circuits from $j^2$ through wire $f^1$, by contact $y^1$ and switch bar $s$, flexible wire $z$, contact $x^1$ and contact block $q^1$, $r^1$. Before the plunger can rise further, to assume the position shown in Fig. 6, it must overcome a further increased resistance exerted by the spring $w$, which now acts at a greater leverage, the fulcrum being the contact $y^1$. This will take place when the current through the coil $i$ to the battery reaches a predetermined amount. In this final position, the lamps will remain connected to the lesser number of cells, but the circuit from the dynamo to the lamps, through resistances $q^2$ and $p^1$ will be broken. As this would mean that the left-hand end cells of the battery would receive the total current from the dynamo, while the remainder of the cells would only receive the difference between the total dynamo current and the current supplied to the lamps, another suitable resistance $e^2$ may be connected between contacts $x^1$ and $t$. This resistance will act in series with $q^2$ and $p^1$ as a shunt across the end cells from $j^2$ to $w^1$ and so protect the end cells from excessive charging. The ends of the series coil $i$ are arranged to be short-circuited by the bar $e^1$ of the switch $e$ when it is in the "off" position, as in the first arrangement described.

In both arrangements, adjustment of the action of the current required to lift the lower switch bar $s$ is effected by means of the spring $w$, while in Fig. 4, the point of application of the spring to the bar may also be varied. The initial air gap between the bar $s$ and contacts $x^1$ $y^1$ and the weight of plunger $h$ are adjusted so as to give the first step in the upward movement of the plunger at the desired battery current and voltage.

The type of automatic switch $g$ shown in Fig. 1 may be used in an arrangement according to Fig. 4, by adding two contacts $x^3$, $y^3$ thereto, such an embodiment being illustrated in Fig. 7 from which it will be understood that the resistance $q^2$ will be connected to the lamp circuit at the first step of operation of the switch $g$ whereas at the second step of its operation the same conditions exist as at the third step of the operation of the switch according to Fig. 4, the intermediate step being omitted.

The invention can be used with any electric light system using storage batteries, and lamps or other consuming devices in parallel with the batteries.

The arrangement of apparatus as shown in Figs. 4, 5 and 6, may also be used for the purpose of introducing resistances into the lamp circuits only, without varying the number of cells, which will be understood from Fig. 8.

The contacts $q$, $r$, $t$ and $u$, in Fig. 1, and the contacts $q$, $r$, $t$, $u$ and $y^1$, in Fig. 4, are preferably provided with carbon contact faces for the purpose of making contact more gradually, and the switch bars $p$ and $s$ may also have carbon contact faces for the same object. Further, instead of a spring $w$, the equivalent thereof may be used.

What I claim is:—

1. In a combined dynamo and battery lighting system, a voltage compensating arrangement comprising in combination with a dynamo cut-out switch, a lamp circuit control switch having an electromagnetic winding which is constantly connected across the terminals of the dynamo and a second winding which has one end connected to one pole of the battery and the other end connected to one side of the lamp circuit and to the dynamo when the cut out switch is closed, the said second winding, when the dynamo is first cut in, being energized and remaining energized by discharging current from the battery so that both windings act in opposition to prevent operation of the switch and enable the dynamo to supply the lighting circuit directly in parallel with the battery until such time as the dynamo voltage sufficiently exceeds the battery voltage as to produce a reversal in the direction of current in the said second winding of the control switch when the two windings will act together to operate the switch and alter the state of the lighting circuit.

2. In a voltage compensating arrangement for a combined dynamo and battery lighting system, a lamp circuit control switch comprising three separate sets of stationary contacts, a solenoid switch member having at one end a bridging piece coöperating with one set of the contacts, and a bridging piece having a lost motion connection with the opposite end of the solenoid switch member and disposed between the remaining two sets of contacts, the spacing of the contacts being such that in one extreme position of the switch member the single set of contacts and one of the double set of contacts are bridged by their respective bridging pieces while in the other extreme position of the switch member the bridging pieces leave the said contacts and that bridging piece which coöperates with the double set of contacts engages the remaining contacts of the double set.

3. In a voltage compensating arrangement for a combined dynamo and battery system, the combination with a dynamo, battery and lamp circuit, of compensating resistances connected to such circuit, a control switch comprising two sets of stationary contacts connected to such compensating resistances, an electromagnetically operated switch member, a bridging piece directly movable with the switch member and a loaded bridging piece having a lost motion connection with the said switch member and a flexible connection to the lighting circuit, both bridging pieces being arranged to short circuit the resistances while the dynamo is idle and to move successively to cut the resistance into the lamp circuit in steps.

4. In a voltage compensating arrangement for a combined dynamo and battery system, the combination with a dynamo, battery and lamp circuit, of compensating resistances connected to said circuit, three sets of stationary contacts to two of which the compensating resistances are connected, a connection from one contact of the third set leading to an intermediate point of the battery and the other contact of said third set being connected to the positive side of the lamp circuit, an electromagnetically operated switch member, a bridging piece directly movable with the switch member and a loaded bridging piece having a lost motion connection with the said switch member and a flexible connection with the second contact of the third set of contacts, both bridging pieces being arranged to short circuit the resistances while the dynamo is idle and to move successively so that the bridging piece directly movable with the switch member inserts one resistance into the lamp circuit, while the other inserts more resistance in the said circuit and thereafter bridges the third set of contacts leaving the lamp circuit connected across a portion only of the battery.

5. In a voltage compensating arrangement for a combined dynamo and battery system, the combination with a dynamo, battery and lamp circuit, of three compensating resistances connected to such circuit, two sets of stationary contacts across which two of the resistances are connected, a lighting circuit contact connected to the positive side of said lamp circuit and to one end of the third resistance the opposite end of which is connected to one of the other two resistances, an electromagnetically operated switch member, a bridging piece directly movable with the switch member and a loaded bridging piece having a lost motion connection with the said switch member and a flexible connection with the lighting circuit contact, both bridging pieces being arranged to short circuit the resistances while the dynamo is idle and to move successively so that the bridging piece directly movable with the switch member first inserts one resistance into the lamp circuit, while the other next inserts the second resistance in the circuit and finally bears against the lighting circuit contact.

6. In a voltage compensating arrangement for a combined dynamo and battery system, the combination with a dynamo, battery and lamp circuit, of three compensating resistances connected to such circuit, three sets of stationary contacts across two of which two of the resistances are connected, a connection from one contact of the third set leading to an intermediate point of the battery and the other contact of said third set being connected to the positive side of the lamp circuit and to one end of the remaining resistance the opposite end of which is connected to one of the other two resistances, an electromagnetically operated switch member, a bridging piece directly movable with the switch member and a loaded bridging piece having a lost motion connection with the said switch member and a flexible connection with one of the third set of contacts, both bridging pieces being arranged to short circuit the resistances while the dynamo is idle and to move successively so that the bridging piece directly movable with the switch member first inserts one resistance into the lamp circuit, while the other next inserts the second resistance in the circuit and finally bridges the third set of contacts leaving the lamp circuit connected across a portion only of the battery and connecting all three resistances as a shunt across the remaining portion of the battery to prevent the same being overcharged.

7. In a voltage compensating arrangement for a combined dynamo and battery system, the combination with a lamp circuit of compensating resistances connected to such circuit, two sets of stationary contacts to which the compensating resistances are connected, a third set of contacts adjacent to one of the first named sets, a connection from one contact of the third set leading to an intermediate point of the battery and the other contact of said third set being connected to the positive side of the lamp circuit, an electromagnetically operated switch member, a bridging piece directly movable with the switch member and coöperating with one of the first named sets of contacts, and a bridging piece arranged between the third set of contacts and the other set adjacent thereto and having a lost motion connection with the said switch member, a flexible connection with that contact of the said third set of contacts connected to the positive side of the lamp circuit and a load applied to one side of the point of application of the force of the switch member thereto, both bridging pieces being arranged to short circuit the resistances while the dynamo is idle and to move successively so that the bridging piece directly movable with the switch member inserts one resistance into the lamp circuit, while the other becomes disengaged from one of the contacts of the resistance which it normally bridges to thereby include such resistance in the lamp circuit, then engages the corresponding contact of the third set to connect the lighting circuit across a portion of the battery and finally bridges both of the contacts of the third set leaving the lighting circuit connected across such portion of the battery and diverting dynamo current from the lighting circuit to the battery.

8. In a voltage compensating arrangement for a combined dynamo and battery system, the combination with a lamp circuit of three compensating resistances connected to such circuit, two sets of stationary contacts across which two of the resistances are connected, a third set of contacts adjacent to one of the first named sets, a connection from one contact of the third set leading to an intermediate point of the battery and the other contact of said third set being connected to the positive side of the lamp circuit and to one end of the remaining resistance the opposite end of which is connected to one of the other resistances, an electromagnetically operated switch member, a bridging piece directly movable with the switch member and coöperating with one of the first named sets of contacts, and a second bridging piece arranged between the third set of contacts and the other set adjacent thereto and having a lost motion connection with the said switch member, a flexible connection between the second bridging piece and that contact of the third set of contacts that is connected to the positive side of the lamp circuit, and a load applied to the second bridging piece to one side of the point of application thereto of the force of the switch member, both bridging pieces being arranged to short circuit the resistance while the dynamo is idle and to move successively so that the bridging piece directly movable with the switch member inserts one resistance into the lamp circuit, while the other bridging member next becomes disengaged from one of the contacts of the resistance which it normally bridges to thereby include such resistance in the lamp circuit, then engages the corresponding contact of the third set to connect the lighting circuit across a portion of the battery and finally bridges both of the contacts of the third set leaving the lamp circuit connected across such portion of the battery and connecting all the resistances as a shunt across the remaining portion of the battery to prevent the same being overcharged by the dynamo.

9. In a combined dynamo and battery lighting system, a voltage compensating arrangement comprising a lamp circuit control switch having a winding adapted to be traversed by battery discharging current while the dynamo is idle and a dynamo cut out switch having contacts which, when the cut out switch is open, short circuit the said winding of the control switch.

Signed at Manchester, England, this fourth day of October, 1910.

THOMAS FERGUSON.

Witnesses:
I. R. JOHNSTONE,
MALCOLM SMETHURST.